US008791189B2

(12) United States Patent
Agarwal et al.

(10) Patent No.: US 8,791,189 B2
(45) Date of Patent: Jul. 29, 2014

(54) MOLDABLE POLYESTER COMPOSITIONS, PROCESSES OF MANUFACTURE, AND ARTICLES THEREOF

(75) Inventors: Parminder Agarwal, Evansville, IN (US); Donald Howard Ellington, Evansville, IN (US); Robert Russell Gallucci, Mt. Vernon, IN (US); Josephus Gerardus M. van Gisbergen, Noord Brabant (NL); Vishvajit Chandrakant Juikar, Karnataka (IN); Ihab Odeh, Evansville, IN (US); Sathish Kumar Ranganathan, Tamilnadu (IN); Kenneth Frederick Miller, Posey, IN (US); Veeraraghavan Srinivasan, Bangalore (IN)

(73) Assignee: SABIC Innovative Plastics IP B.V. (NL)

( * ) Notice: Subject to any disclaimer, the term of this patent is extended or adjusted under 35 U.S.C. 154(b) by 1148 days.

(21) Appl. No.: 12/187,723

(22) Filed: Aug. 7, 2008

(65) Prior Publication Data

US 2009/0179035 A1 Jul. 16, 2009

Related U.S. Application Data

(60) Provisional application No. 61/021,260, filed on Jan. 15, 2008.

(51) Int. Cl.
*C08K 3/32* (2006.01)
*C08K 5/36* (2006.01)
*C08K 5/13* (2006.01)

(52) U.S. Cl.
USPC ........... 524/417; 524/131; 524/133; 524/282; 524/323; 220/645; 264/540

(58) Field of Classification Search
USPC .......... 524/417, 131, 133, 282, 323; 220/645; 264/540
See application file for complete search history.

(56) References Cited

U.S. PATENT DOCUMENTS

| | | | |
|---|---|---|---|
| 4,056,514 A | 11/1977 | Strehler et al. | |
| 4,292,233 A * | 9/1981 | Binsack et al. | 524/494 |
| 4,439,597 A | 3/1984 | Hall, Jr. et al. | |
| 4,511,708 A | 4/1985 | Kasuga et al. | |
| 4,818,808 A | 4/1989 | Kushimoto et al. | |
| 5,057,622 A | 10/1991 | Chisholm et al. | |
| 5,688,898 A | 11/1997 | Bhatia | |
| 5,883,165 A | 3/1999 | Krohnke et al. | |
| 6,224,791 B1 | 5/2001 | Stevenson et al. | |
| 2002/0016116 A1 | 2/2002 | Christopherson et al. | |
| 2003/0020803 A1 | 1/2003 | Yang et al. | |
| 2005/0043450 A1 | 2/2005 | Goodrich et al. | |
| 2005/0159517 A1 | 7/2005 | Warth et al. | |
| 2007/0203243 A1 | 8/2007 | Daugs | |
| 2007/0208160 A1 | 9/2007 | Agarwal et al. | |
| 2007/0213471 A1 * | 9/2007 | Kim et al. | 525/437 |

FOREIGN PATENT DOCUMENTS

| | | |
|---|---|---|
| EP | 0022216 | 1/1981 |
| EP | 0056243 | 7/1982 |
| EP | 0535908 | 4/1993 |
| GB | 215459 | 5/1924 |
| GB | 1388031 | 3/1975 |
| GB | 1464485 | 2/1977 |
| WO | 03066704 | 8/2003 |
| WO | 2008124604 A1 | 10/2008 |

OTHER PUBLICATIONS

European Patent Office—PCT ISR: International Application No. PCT/US2009/030983, Date of Mailing: Apr. 24, 2009.
European Patent Office—PCT Written Opinion: International Application No. PCT/US2009/030983, Date of Mailing: Apr. 24, 2009.
European Patent Office—PCT ISR: International Application No. PCT/US2009/030984, Date of Mailing: May 6, 2009.
European Patent Office—PCT Written Opinion: International Application No. PCT/US20091030984, Date of Mailing: May 6, 2009.
ASTM Designation: ASTM D 471-06, Standard Test Method for Rubber Property-Effect of Liquids, pp. 1-13 (2006).
ASTM Designation: ASTM D 638-03, Standard Test Method for Tensile Properties of Plastics, pp. 1-15 (2003).
ASTM Designation: ASTM D 648-07, Standard Test Method for Deflection Temperature of Plastics Under Flexural Load in the Edgewise Position, pp. 1-13 (2007).
ASTM Designation: ASTM D 790-03, Standard Test Method for Flexural Properties of Unreinforced and Reinforced Plastics and Electrical Insulating Materials, pp. 1-11 (2003).
ASTM Designation: ASTM D 1238-01, Standard Test Method for Melt Flow Rates of Thermoplastics by Extrusion, pp. 1-12 (2001).
ASTM Designation: ASTM D 3418-03, Standard Test Method for Transition Temperatures and Enthalpies of Fusion and Crystallization of Polymers by Differential Scanning Calorimetry, pp. 1-7 (2003).
ASTM Designation: ASTM D 3763-06, Standard Test Method for High Speed Puncture Properties of Plastics Using Load and Displacement Sensors, pp. 1-9 (2006).
ASTM Designation: ASTM D 3835-02, Standard Test Method for Determination of Properties of Polymeric Materials by Means of Capillary Rheometer, pp. 1-11 (2002).
ASTM Designation: ASTM D 4203-00, Standard Specification for Styrene-Acrylonitrile (SAN) Injection and Extrusion Materials, pp. 8 (2000).
M. Nulman, et al., "Fuel Permeation of Polyemeric Materials," SAE Technical Paper, pp. 1-22 (2001-Jan. 1999).

* cited by examiner

*Primary Examiner* — Robert D. Harlan
(74) *Attorney, Agent, or Firm* — Cantor Colburn LLP

(57) ABSTRACT

A thermoplastic composition comprises, based on the total weight of the composition: 51-90 wt % polyester, 10-49 wt % ABS impact modifier; 0-20 wt % of multifunctional epoxy compound; 0-40 wt % filler; 0-2 wt % fibrillated fluoropolymer; and more than 0 to 5 wt % of a stabilizer composition. An article blow molded or injection molded from the composition has a multi-axial impact total energy from 30-100 Joules at −30° C. and a ductility of more than 90%; a permeability of more than 0 and less than or equal to 1.5 g/m²-day to ASTM D 471-98 Fuel C, measured after exposure to ASTM D 471-98 Fuel C vapor for 20 weeks at 40° C.; an MVR of 1-20 cc/10 min., measured at 265° C.; a flexural modulus of greater than 1300 MPa; and retains at least 75% of its initial tensile elongation at break, after exposure to Fuel E85 for 28 days at 70° C.

24 Claims, No Drawings

MOLDABLE POLYESTER COMPOSITIONS, PROCESSES OF MANUFACTURE, AND ARTICLES THEREOF

CROSS-REFERENCE TO RELATED APPLICATION

This application claims the benefit of U.S. Provisional Application Ser. No. 61/021,260, filed on Jan. 15, 2008, which in incorporated herein by reference in its entirety.

BACKGROUND OF THE INVENTION

This disclosure relates to polyester compositions, processes of manufacture, and articles thereof.

Polyesters, copolyesters, and their blends with other thermoplastics have a number of advantageous properties, in particular high mechanical strength and good processability, which make them useful in a wide variety of applications. Nonetheless, there remains a long felt need for methods for improving specific property combinations in polyester compositions, compositions (and articles made from the compositions) that exhibit a certain combination of useful properties, regardless whether the composition is subjected to an injection molding process or a blow molding processes. One such combination is good low temperature ductility, low permeability, and chemical resistance. A combination of low temperature ductility, low permeability, and good chemical resistance would be useful for articles that are manufactured by injection or blow molding processes. These features are especially useful for fuel tanks, such as gasoline containers, which must remain in contact with fuels for extended periods. These tanks are often manufactured by blow molding.

Unfortunately, ordinary technology and available information has been unable in disclosing or teaching compositions that exhibit a combination of low temperature ductility and good chemical resistance and low permeability that are manufactured by injection or blow molding processes. Blow-molding processes are typically more demanding process than injection molding processes, because, in part, the conditions created by blow molding processes subject the molten polymer to air for relatively longer periods of time than injection molding processes-factors that have been known to adversely affect the properties of the compositions and the articles made from them. Improvements in low temperature ductility have been found to degrade the chemical resistance and low permeability of polyester compositions, and conversely, improvements in chemical resistance, particularly to fuels and/or short chain alcohols, have been found to worsen low temperature ductility. Further, regulatory changes have created the need for improved polymers that exhibit a useful combination of low temperature ductility, good chemical resistance, and low permeability when exposed to gasoline, biofuels such as ethanol-containing fuels, and other new fuels.

For the foregoing reasons, there accordingly remains a need in the art for polyester compositions that have improved low temperature ductility and good chemical resistance, particularly when articles formed from the compositions are blow molded.

BRIEF DESCRIPTION OF THE INVENTION

In one embodiment, the invention relates to a thermoplastic composition comprising, based on the total weight of the composition:
from 51 to 90 wt % of a polyester having
  a weight average molecular weight from 20,000 to 80,000 daltons,
  a carboxylic acid end group content from 5 to 50 meq/Kg, and
  a melting point temperature from 200 to 285° C.,
  wherein the polyester is selected from the group consisting of poly(ethylene terephthalate)s, poly(1,4-butylene terephthalate)s, poly(1,3-propylene terephthalate)s, poly(cyclohexanedimethanol terephthalate)s, poly(cyclohexanedimethylene terephthalate)-co-poly(ethylene terephthalate)s, and a combination thereof;
from 10 to 49 wt % of an acrylonitrile-butadiene-styrene impact modifier composition, having
  an average particle size of 50 to 800 micrometers,
  a gel content of at least 50 wt %,
  a polybutadiene content of at least 50 wt % of the impact modifier composition, and
  a soluble styrene-acrylonitrile copolymer content ranging from 0 to 10 wt % of the impact modifier composition;
from 0 to 20 wt % of a multifunctional epoxy compound;
from 0 to 40 wt % of a filler;
from 0 to 2 wt % of a fibrillated fluoropolymer; and
from more than 0 to 5 wt % of a stabilizer composition comprising a stabilizer selected from the group consisting of more than 0.2 wt % of at least one thioether ester, hindered phenols, phosphites, phosphonites, phosphoric acid, and a combination thereof, wherein at least one of the foregoing stabilizers has a molecular weight of greater than 500 daltons;
wherein an article that is blow molded or injection molded from the thermoplastic composition
  has a multi-axial impact total energy ranging from 30 to 100 Joules at −30° C., measured in accordance with ASTM D3763, and a ductility of more than 50%;
  has a permeability of more than 0 and less than or equal to 1.5 g/m$^2$-day to ASTM D 471-98 Fuel C, measured after exposure to ASTM D 471-98 Fuel C vapor for 20 weeks at 40° C., using a disc having a diameter of 22 mm and a thickness of 2 mm;
  has an MVR of 1 to 20 cc/10 min, measured in accordance with ASTM D1238 at 265° C.;
  has a flexural modulus of greater than 1300 MPa, measured in accordance with ASTM D790; and
  retains at least 75% of its initial tensile elongation at break, as measured by ASTM D638, after exposure to Fuel E85 for 28 days hours at 70° C.

In another embodiment, the invention relates to a thermoplastic composition comprising, based on the total weight of the composition:
from 51 to 90 wt % of a polyester having
  a weight average molecular weight from 20,000 to 80,000 daltons,
  a carboxylic acid end group content from 5 to 50 meq/Kg, and
  a melting point temperature from 200 to 285° C.,
  wherein the polyester is poly(1,4-butylene terephthalate)s,
from 10 to 49 wt % of an acrylonitrile-butadiene-styrene impact modifier composition, having
  an average particle size of 50 to 800 micrometers,
  a gel content of at least 50 wt %,
  a polybutadiene content of at least 50 wt % of the impact modifier composition, and a soluble styrene-acrylonitrile copolymer content ranging from 0 to 10 wt % of the impact modifier composition;
from more than 0 to 20 wt % of a multifunctional epoxy compound;
from 0 to 40 wt % of a filler;
from 0.1 to 1.0 wt. % of a fibrillated fluoropolymer, the fibrillated fluoropolymer being an encapsulated fluoropolymer comprising poly(tetrafluoroethylene) encapsulated with styrene-acrylonitrile and is present in an amount ranging
from more than 0 to 5 wt % of a stabilizer composition comprising a stabilizer selected from the group consisting of thioether esters, hindered phenols, phosphites, phosphonites, phosphoric acid, and a combination thereof, wherein at least one of the foregoing stabilizers has a molecular weight of greater than 500 daltons;
wherein an article that is blow molded or injection molded from the thermoplastic composition
has a multi-axial impact total energy ranging from 30 to 100 Joules at −30° C., measured in accordance with ASTM D3763, and a ductility of more than 50%;
has a permeability of more than 0 and less than or equal to 1.5 g/m²-day to ASTM D 471-98 Fuel C, measured after exposure to ASTM D 471-98 Fuel C vapor for 20 weeks at 40° C., using a disc having a diameter of 22 mm and a thickness of 2 mm;
has an MVR of 1 to 20 cc/10 min, measured in accordance with ASTM D1238 at 265° C.;
has a flexural modulus of greater than 1300 MPa, measured in accordance with ASTM D790; and
retains at least 75% of its initial tensile elongation at break, as measured by ASTM D638, after exposure to Fuel E85 for 28 days at 70° C.

In another embodiment, an injection molded article comprises the thermoplastic composition.

In another embodiment, an blow molded article comprises the thermoplastic composition.

In another embodiment, the invention relates to a process for blow molding a fuel tank, which comprises:
heating a thermoplastic composition in a screw-driven melt processing device to a temperature of 230 to 300° C. to form a molten composition;
pushing the molten composition through an orifice to create an annular tube of the molten thermoplastic composition;
closing off an end of the annular tube to form a closed end annular tube;
encasing the closed ended annular tube in a mold;
blowing a gas into the closed ended annular tube while the thermoplastic composition is above the crystallization temperature of the composition, until the closed ended tube assumes the shape of the mold to form a shaped tube; and
cooling the shaped tube to temperature below the crystallization temperature of the thermoplastic composition to form the article;
wherein the composition comprises
from 51 to 90 wt % of a polyester having
a weight average molecular weight from 20,000 to 80,000 daltons,
a carboxylic acid end group content from 5 to 50 meq/Kg, and
a melting point temperature from 200 to 285° C.,
wherein the polyesters is selected from the group consisting of poly(ethylene terephthalate)s, poly(1,4-butylene terephthalate)s, poly(1,3-propylene terephthalate)s, poly(cyclohexanedimethanol terephthalate)s, poly(cyclohexanedimethylene terephthalate)-co-poly(ethylene terephthalate)s, and a combination thereof;
from 10 to 49 wt % of an acrylonitrile-butadiene-styrene impact modifier composition, having
an average particle size from 50 to 800 micrometers,
a gel content of at least 50 wt %, and
a polybutadiene content of at least 50 wt % of the impact modifier composition;
from 0 to 20 wt % of a multifunctional epoxy compound;
from 0 to 40 wt % of a filler;
from 0 to 2 wt % of a fibrillated fluoropolymer; and
from more than 0 to 5 wt % of a stabilizer composition, wherein the stabilizer composition comprises at least 20 wt % thioether ester, based on the weight of the stabilizer composition, and at least one additional stabilizer selected from the group consisting of hindered phenols, phosphites, phosphonites, phosphoric acid, and a combination thereof;
wherein each of the foregoing stabilizers has a molecular weight of greater than 500 daltons; and
wherein a blow molded article of the composition has a multi-axial impact total energy from 30 to 100 Joules at −30° C., measured in accordance with ASTM D3763.

Various other features, aspects, and advantages of the present invention will become more apparent with reference to the following description, examples, and appended claims.

DETAILED DESCRIPTION OF THE INVENTION

The invention is based on the unexpected discovery that polyester compositions with improved low temperature ductility and good chemical resistance and permeability can be obtained using specific combination of certain high molecular weight polyesters, specific impact modifiers having particular properties, and a stabilizer composition. The composition can further include a multifunctional epoxy compound and/or a fluoropolymer when specific performance properties are needed. In particular, the compositions have good ductility, low permeability, and resistance to gasoline and short chain alcohols. These properties are especially useful for the manufacture of articles such as fuel tanks and containers for gasoline. Such properties are advantageously also obtained when the compositions are blow molded or injection molded to form articles.

The singular forms "a," "an," and "the" include plural referents unless the context clearly dictates otherwise. The terms "first," "second," and the like herein do not denote any order, quantity, or importance, but rather are used to distinguish one element from another. As used herein, the "(meth) acryl" prefix includes both the methacryl and acryl. Unless defined otherwise, technical and scientific terms used herein have the same meaning as is commonly understood by one of skill. Compounds are described using standard nomenclature.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations. The endpoints of all ranges directed to the same component or property are inclusive of the endpoint and independently combinable.

All ASTM tests and data are from the 2003 edition of the Annual Book of ASTM Standards unless otherwise indicated.

The thermoplastic compositions disclosed herein comprise based on the total weight of the composition: from 51 to 90 wt % of a polyester, 10 to 49 wt % of an acrylonitrile-butadiene-styrene impact modifier, from 0 to 20 wt % of a multifunctional epoxy compound; from 0 to 40 wt % of a filler; from 0 to 2 wt % of a polymer-encapsulated fibrillated fluoropolymer; and from more than 0 to 5 wt % of a stabilizer. An article which is blow molded or injection molded from the thermoplastic composition has a ductility of more than 90% and a multi-axial impact total energy ranging from 30 to 100 Joules at −30° C. measured in accordance with ASTM D3763. The article also has a permeability of more than 0 and less than or equal to 1.5 g/m2-day to ASTM D 471-98 Fuel C, measured after exposure to ASTM D 471-98 Fuel C vapor for 20 weeks at 40° C., using a disc having a diameter of 22 mm and a thickness of 2 mm. The article also has an MVR (melt volume flow rate) of 1 to 20 cc/10 min., measured in accordance with ASTM D1238 at 265° C. The article also has a flexural modulus of greater than 1300 MPa, measured in accordance with ASTM D790. The article also retains at least 75% of its initial tensile elongation at break, as measured by ASTM D638, after exposure to Fuel E85 for 28 days at 70° C.

Polyesters for use in the present thermoplastic compositions having repeating structural units of formula (I)

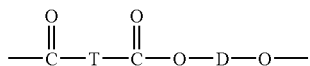
(I)

wherein each T is independently the same or different divalent $C_{6-10}$ aromatic group derived from a dicarboxylic acid or a chemical equivalent thereof, and each D is independently a divalent $C_{2-4}$ alkylene group derived from a dihydroxy compound or a chemical equivalent thereof. Copolyesters containing a combination of different T and/or D groups can be used. Chemical equivalents of diacids include the corresponding esters, alkyl esters, e.g., $C_{1-3}$ dialkyl esters, diaryl esters, anhydrides, salts, acid chlorides, acid bromides, and the like. Chemical equivalents of dihydroxy compounds include the corresponding esters, such as $C_{1-3}$ dialkyl esters, diaryl esters, and the like. The polyesters can be branched or linear.

Examples of $C_{6-14}$ aromatic dicarboxylic acids that can be used to prepare the polyesters include isophthalic acid, terephthalic acid, 1,2-di(p-carboxyphenyl)ethane, 4,4'-dicarboxydiphenyl ether, 4,4'-bisbenzoic acid, and the like, and 1,4- or 1,5-naphthalene dicarboxylic acids and the like. A combination of isophthalic acid and terephthalic acid can be used, wherein the weight ratio of isophthalic acid to terephthalic acid is 91:9 to 2:98, specifically 25:75 to 2:98.

Exemplary diols useful in the preparation of the polyesters include $C_{2-4}$ aliphatic diols such as ethylene glycol, 1,2-propylene glycol, 1,3-propylene glycol, 1,4-butane diol, 1,2-butylene diol, 1,4-but-2-ene diol, and the like. In one embodiment, the diol is ethylene and/or 1,4-butylene diol. In another embodiment, the diol is 1,4-butylene diol. In still another embodiment, the diol is cyclohexanedimethanol.

Specific exemplary polyesters include poly(ethylene terephthalate) (PET), poly(1,4-butylene terephthalate) (PBT), poly(ethylene naphthalate) (PEN), poly(butylene naphthalate) (PBN), and poly(1,3-propylene terephthalate) (PPT). In one embodiment, the polyester is PET and/or PBT. In still another specific embodiment, the polyester is PBT. It is to be understood that such terephthalate-based polyesters can include small amounts of isophthalate esters as well.

In order to attain the desired combination of ductility at low temperature and chemical resistance, the polyester has a weight average molecular weight (Mw) of the polymers ranges from 20,000 to 80,000 daltons, against polystyrene standards, as measured by gel permeation chromatography in chloroform/hexafluoroisopropanol (5:95, volume/volume ratio) at 25° C. The use of lower molecular weight polyesters, or different polyesters, does not necessarily provide compositions with the desired impact properties and/or chemical resistance. The polyester has a carboxylic acid end group content from 5 to 50 meq/Kg, and, a melting point (Tm) from 200 to 285° C. In some instances the polyester will have a crystallization temperature (Tc) from 120 to 190° C.

The polyesters can have an intrinsic viscosity (as measured in phenol/tetrachloroethane (60:40, volume/volume ratio) at 25° C.) of 0.2 to 2.0 deciliters per gram.

Other polyesters can be present in the thermoplastic composition, provided that such polyesters do not significantly adversely affect the desired properties of the thermoplastic composition. Such additional polyesters include, for example, poly(1,4-cyclohexylendimethylene terephthalate) (PCT), poly(1,4-cyclohexylenedimethylene cyclohexane-1,4-dicarboxylate) also known as poly(cyclohexane-1,4-dimethanol cyclohexane-1,4-dicarboxylate) (PCCD), and poly(1,4-cyclohexylenedimethylene terephthalate-co-isophthalate) (PCTA).

Other polyesters that can be present are copolyesters derived from an aromatic dicarboxylic acid (specifically terephthalic acid and/or isophthalic acid) and a mixture comprising a linear $C_{2-6}$ aliphatic diol (specifically ethylene glycol and butylene glycol); and a $C_{6-12}$ cycloaliphatic diol (specifically 1,4-hexane diol, dimethanol decalin, dimethanol bicyclooctane, 1,4-cyclohexane dimethanol and its cis- and trans-isomers, 1,10-decane diol, and the like) or a linear poly($C_{2-6}$ oxyalkylene)diol (specifically, poly(oxyethylene)glycol) and poly(oxytetramethylene)glycol). The ester units comprising the two or more types of diols can be present in the polymer chain as individual units or as blocks of the same type of units. Specific esters of this type include poly(1,4-cyclohexylene dimethylene co-ethylene terephthalate) (PCTG) wherein greater than 50 mol % of the ester groups are derived from 1,4-cyclohexanedimethanol; and poly(ethylene-co-1,4-cyclohexylenedimethylene terephthalate) wherein greater than 50 mol % of the ester groups are derived from ethylene (PCTG). Also included are thermoplastic poly(ester-ether) (TPEE) copolymers such as poly(ethylene-co-poly(oxytetramethylene)terephthalate. Also contemplated for use herein are any of the above polyesters with minor amounts, e.g., from 0.5 to 5 percent by weight, of units derived from aliphatic acid and/or aliphatic polyols to form copolyesters. The aliphatic polyols include glycols, such as poly(ethylene glycol) or poly(butylene glycol).

While other polyesters can be present in the thermoplastic compositions, it is to be understood that the compositions comprise less than 70 weight percent (wt. % or wt %), specifically less than 50 wt. %, more specifically less than 30 wt. %, even more specifically less than 10 wt. % of a polyester derived from a $C_{3-20}$ dicarboxylic acid or a chemical equivalent thereof, and an aliphatic diol or a chemical equivalent thereof, wherein the aliphatic diol is 1,3-propylene glycol, neopentyl glycol, 1,5-pentanediol, 1,6-hexanediol, decamethylene glycol, cyclohexanediol, 1,4-cyclohexanedimethanol, or a combination of the foregoing diols.

In a specific embodiment, it is desirable to limit the amount of other polyesters in the thermoplastic composition, in order to maintain good ductility and chemical resistance. Thus, in this embodiment, the polymer component of the composition consists essentially of PET and/or PBT, and less than 35.8 wt. % of a different polyester, specifically less than 20 wt. % of a different polyester, and even more specifically less than 10 wt. % of a different polyester, based on the total weight of the composition. In another specific embodiment, the polymer component of the thermoplastic composition consists of PET and/or PBT, and less than 35.8 wt. % of a different polyester, specifically less than 20 wt. % of a different polyester, and even more specifically less than 10 wt. % of a different polyester. In a preferred embodiment, the only polyester in the composition is PBT, with 0 to 10 wt. % of a different polyester. In another preferred embodiment, the only polyester in the composition is PBT.

The polyesters can be obtained by methods well known to those skilled in the art, including, for example, interfacial polymerization, melt-process condensation, solution phase condensation, and transesterification polymerization. Such polyester resins are typically obtained by the condensation or ester interchange polymerization of the diacid or diacid chemical equivalent component with the diol or diol chemical equivalent component with the component. The condensation reaction may be facilitated by the use of a catalyst of the type known in the art, with the choice of catalyst being determined by the nature of the reactants. For example, a dialkyl ester such as dimethyl terephthalate can be transesterified with butylene glycol using acid catalysis, to generate poly(butylene terephthalate).

It is possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the thermoplastic composition. Recycled polyesters and blends of recycled polyesters with virgin polyesters can also be used. For example, the PBT can be made from monomers or derived from PET, e.g., by a recycling process.

The thermoplastic composition further comprises a polyfunctional or multifunctional epoxy compound that can be either polymeric or non-polymeric. The term "polyfunctional" or "multifunctional" in connection with the multifunctional epoxy compound means that at least two reactive epoxy groups are present in each molecule of the material. The polyfunctional epoxy material can contain aromatic and/or aliphatic residues. Examples include epoxy Novolac resins, epoxidized vegetable (e.g., soybean, linseed) oils, tetraphenylethylene epoxide, styrene-acrylic copolymers containing pendant glycidyl groups, glycidyl methacrylate-containing polymers and copolymers, and difunctional epoxy compounds such as 3,4-epoxycyclohexylmethyl-3,4-epoxycyclohexanecarboxylate.

Polymeric multifunctional epoxy compounds as used herein include oligomers. Exemplary polymeric multifunctional epoxy materials include the reaction products of one or more ethylenically unsaturated compounds (e.g., styrene, ethylene and the like) with an epoxy-containing ethylenically unsaturated monomer (e.g., a glycidyl C1-4 (alkyl)acrylate, allyl glycidyl ethacrylate, and glycidyl itoconate).

For example, in one embodiment the polymeric multifunctional epoxy compound is a styrene-acrylic copolymer (including an oligomer) containing glycidyl groups incorporated as side chains. Several useful examples are described in the International Patent Application WO 03/066704 A1, assigned to Johnson Polymer, LLC, which is incorporated herein by reference in its entirety. These materials are based on copolymers with styrene and acrylate building blocks that have glycidyl groups incorporated as side chains. A high number of epoxy groups per polymer chain is desired, at least about 10, for example, or greater than about 15, or greater than about 20. These polymeric materials generally have a molecular weight greater than about 3000, preferably greater than about 4000, and more preferably greater than about 6000. These are commercially available from Johnson Polymer, LLC under the JONCRYL® trade name, preferably the JONCRYL® ADR 4368 material.

Another example of a polymeric multifunctional epoxy compound is the reaction product of an epoxy-functional $C_{1-4}$(alkyl)acrylic monomer with a non-functional styrenic and/or $C_{1-4}$(alkyl)acrylate and/or olefin monomer. In one embodiment the polymeric multifunctional epoxy compound is the reaction product of an epoxy-functional (meth)acrylic monomer and a non-functional styrenic and/or (meth)acrylate monomer. These polymeric multifunctional epoxy compounds are characterized by relatively low molecular weights. In another embodiment, the polymeric multifunctional epoxy compound is an epoxy-functional styrene (meth) acrylic copolymer produced from an epoxy functional (meth) acrylic monomer and styrene. As used herein, the term "(meth)acrylic" includes both acrylic and methacrylic monomers, and the term "(meth)acrylate includes both acrylate and methacrylate monomers. Examples of specific epoxy-functional (meth)acrylic monomers include, but are not limited to, those containing 1,2-epoxy groups such as glycidyl acrylate and glycidyl methacrylate.

Suitable C1-4(alkyl)acrylate comonomers include, but are not limited to, acrylate and methacrylate monomers such as methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, and isobornyl methacrylate. Combinations comprising at least one of the foregoing comonomers can be used.

Suitable styrenic monomers include, but are not limited to, styrene, alpha-methyl styrene, vinyl toluene, p-methyl styrene, t-butyl styrene, o-chlorostyrene, and mixtures comprising at least one of the foregoing. In certain embodiments the styrenic monomer is styrene and/or alpha-methyl styrene.

In another embodiment, the multifunctional epoxy compound has two terminal epoxy functionalities, and optionally additional epoxy (or other) functionalities. The compound can further contain only carbon, hydrogen, and oxygen. Difunctional epoxy compounds, in particular those containing only carbon, hydrogen, and oxygen can have a molecular weight of below about 1000 g/mol, to facilitate blending with the polyester resin. In one embodiment, the difunctional epoxy compounds have at least one of the epoxide groups on a cyclohexane ring. Exemplary difunctional epoxy compounds include, but are not limited to, 3,4-epoxycyclohexyl- 3,4-epoxycyclohexyl carboxylate, bis(3,4-epoxycyclohexylmethyl)adipate, vinylcyclohexene di-epoxide, bisphenol diglycidyl ethers such as bisphenol-A diglycidyl ether, tetrabromobisphenol-A diglycidyl ether, glycidol, diglycidyl adducts of amines and amides, diglycidyl adducts of carboxylic acids such as the diglycidyl ester of phthalic acid the diglycidyl ester of hexahydrophthalic acid, and bis(3,4-epoxy-6-methylcyclohexylmethyl)adipate, butadiene diepoxide, vinylcyclohexene diepoxide, dicyclopentadiene diepoxide, and the like. Especially preferred is 3,4-epoxycyclohexyl-3,4 epoxycyclohexylcarboxylate.

The multifunctional epoxy compounds can be made by techniques well known to those skilled in the art. For example, the corresponding alpha- or beta-dihydroxy compounds can be dehydrated to produce the epoxide groups, or the corresponding unsaturated compounds can be epoxidized by treatment with a peracid, such as peracetic acid, in well-known techniques. The compounds are also commercially available.

Other preferred materials with multiple epoxy groups are acrylic and/or polyolefin copolymers and oligomers containing glycidyl groups incorporated as side chains. Suitable epoxy-functional materials are available from Dow Chemical Company under the trade name D.E.R.332, D.E.R.661, and D.E.R.667; from Resolution Performance Products under the trade name EPON® Resin 1001F, 1004F, 1005F, 1007F, and 1009F (registered to Shell Oil Corporation); from Shell Oil Corporation under the trade names EPON® 826, 828, and 871; from Ciba Specialty Chemicals under the trade names CY-182 and CY-183; and from Dow Chemical Co. under the tradename ERL-4221 and ERL-4299. Johnson Polymer Co. is a supplier of an epoxy functionalized material known as ADR4368 and 4300. A further example of a polyfunctional carboxy-reactive material is a co- or terpolymer including units of ethylene and glycidyl methacrylate (GMA), sold by Arkema under the trade name LOTADER®.

The multifunctional epoxy compound can comprise other functionalities that are either reactive or non-reactive under the described processing conditions, including hydroxyl, isocyanate, carbodiimide, orthoester, oxazoline, oxirane, aziridine, anhydride, and the like. The multifunctional epoxy compound can also comprise reactive silicon-containing materials, for example epoxy-modified silicone and silane monomers and polymers. If desired, a catalyst or co-catalyst system can be used to accelerate the reaction between the multifunctional epoxy material and the polyester.

The multifunctional epoxy compound is added to the thermoplastic compositions in amounts effective to improve visual and/or measured physical properties. In one embodiment, the multifunctional epoxy compound is added to the thermoplastic compositions in an amount effective to improve the solvent resistance of the composition, in particular the fuel-resistance of the composition. A person skilled in the art may determine the optimum type and amount of any given multifunctional epoxy compound without undue experimentation, using the guidelines provided herein.

In one embodiment the thermoplastic composition comprises more than zero to 20 wt % of a multifunctional epoxy compound selected from the group consisting of cycloaliphatic diepoxy compounds, copolymers comprising units derived from the reaction of an ethylenically unsaturated compound and glycidyl(meth)acrylate, terpolymers comprising units derived from the reaction of two different ethylenically unsaturated compounds and glycidyl(meth)acrylate, styrene-(meth)acrylic copolymers containing a glycidyl groups incorporated as a side chain, and a combination thereof.

In one embodiment the thermoplastic composition comprises, based on total weight of the composition, from 1 to 15 wt % of a dicycloaliphatic diepoxy compound or a terpolymer comprising units derived from the reaction of ethene, a $C_{1-6}$ alkyl(meth)acrylate, and glycidyl(meth)acrylate. In one embodiment the amount of multifunctional epoxy compound in the thermoplastic composition is about 10 to 320 milliequivalents epoxy group per 1.0 kg of the polyester.

The thermoplastic composition further comprises an acrylonitrile-butadiene-styrene impact modifier, herein referred to as ABS impact modifiers.

The ABS impact modifier is preferably a graft polymer built up from a rubber-like core comprising butadiene on which acrylonitrile-styrene copolymer has been grafted. In some instance the ABS can be a core shell structure, wherein the core is a polybutadiene that may contain. The shell can be built up for the greater part from a vinyl aromatic compound and/or vinyl cyanide. The core and/or the shell(s) often comprise multi-functional compounds that may act as a crosslinking agent and/or as a grafting agent. These polymers are usually prepared in several stages. Core shell acrylic rubbers can be of various particle sizes. The preferred range is from 50 to 800 micrometers.

ABS modifiers contribute impact strength of polymer compositions. The rubbery component has a Tg (glass transition temperature) below 0° C., preferably between about −40° to about −80° C. Preferably, the rubber content is at least about 10% by weight, most preferably, at least about 50%.

Typical other ABS impact modifiers are the butadiene core-shell polymers of the type available from Chemtura under the trade name BLENDEX®. The impact modifier comprises a two stage polymer having a butadiene based rubbery core, and a second stage polymerized from acrylonitrile and styrene grafted onto cross-linked butadiene polymer, which are disclosed in U.S. Pat. No. 4,292,233 herein incorporated by reference. Other suitable impact modifiers may be mixtures comprising graft and core shell impact modifiers made via emulsion polymerization using acrylonitrile, styrene and butadiene.

The impact modifier can comprise styrene-acrylonitrile copolymer (hereinafter SAN). Some SAN copolymers are described in ASTM D4203. The preferred SAN composition comprises at least 15, preferably 25 to 28, percent by weight acrylonitrile (AN) with the remainder styrene, para-methyl styrene, or alpha methyl styrene. Another example of SANs useful herein include those modified by grafting SAN to a rubbery substrate such as, for example, 1,4-polybutadiene, to produce a rubber graft polymeric impact modifier. High rubber content (greater than 50% by weight) resin of this type (HRG-ABS) can be especially useful for impact modification of polyester resins.

Another preferred class of impact modifier is referred to as high rubber graft ABS modifiers, comprising greater than or equal to about 90% by weight SAN grafted onto polybutadiene, the remainder being free SAN. In some instances the free, ungrafted SAN can be from 0 to 5 wt % of the impact modifier. ABS can have butadiene contents between 12% and 85% by weight, more particularly at least 50%, and styrene to acrylonitrile ratios between 90:10 and 60:40. Thermoplastic compositions can include: about 8% acrylonitrile, 43% butadiene and 49% styrene, or more specifically about 7% acrylonitrile, 50% butadiene and 43% styrene, by weight. These materials are commercially available under the trade names BLENDEX® 336 and BLENDEX® 415, and BLENDEX® 338 respectively (Chemtura Corporation). Another preferred thermoplastic composition is about 7% acrylonitrile, 69% butadiene and 24% styrene and is available commercially under the trade name BLENDEX® 338 from Chemtura Corporation. Another example of preferred composition is SG24 rubber from Ube Cycon Limited.

In one embodiment the thermoplastic composition comprises from 10 to 49 wt % of an acrylonitrile-butadiene-styrene impact modifier composition, having an average particle size of 200 to 800 micrometers, a gel content of at least 50 wt %, a polybutadiene content of at least 50 wt % of the impact modifier composition, and a soluble styrene-acrylonitrile copolymer content ranging from 0 to 10 wt % of the impact modifier composition.

The thermoplastic compositions can further comprise from 0 to 2 wt. % of a fibrillated fluoropolymer, based on total weight of the composition. Suitable fluoropolymers include particulate fluoropolymers which can be encapsulated and which form a fibril, such as poly(tetrafluoroethylene) (PTFE).

The fluoropolymers are capable of being fibrillated ("fibrillatable") during mixing, individually or collectively, with the polyester. "Fibrillation" is a term of art that refers to the treatment of fluoropolymers so as to produce, for example, a "node and fibril," network, or cage-like structure. Suitable fluoropolymers include but are not limited to homopolymers and copolymers that comprise structural units derived from one or more fluorinated alpha-olefin monomers, that is, an alpha-olefin monomer that includes at least one fluorine atom in place of a hydrogen atom. In one embodiment, the fluoropolymer comprises structural units derived from two or more fluorinated alpha-olefin, for example tetrafluoroethylene, hexafluoroethylene, and the like. In another embodiment, the fluoropolymer comprises structural units derived from one or more fluorinated alpha-olefin monomers and one or more non-fluorinated monoethylenically unsaturated monomers that are copolymerizable with the fluorinated monomers. Examples of suitable fluorinated monomers include and are not limited to alpha-monoethylenically unsaturated copolymerizable monomers such as ethylene, propylene, butene, acrylate monomers (e.g., methyl methacrylate and butyl acrylate), vinyl ethers, (e.g., cyclohexyl vinyl ether, ethyl vinyl ether, n-butyl vinyl ether, vinyl esters) and the like. Specific examples of fluoropolymers include polytetrafluoroethylene, polyhexafluoropropylene, polyvinylidene fluoride, polychlorotrifluoroethylene, ethylene tetrafluoroethylene, fluorinated ethylene-propylene, polyvinyl fluoride, and ethylene chlorotrifluoroethylene. Combinations of the foregoing fluoropolymers can also be used.

Fluoropolymers are available in a variety of forms, including powders, emulsions, dispersions, agglomerations, and the like. "Dispersion" (also called "emulsion") fluoropolymers are generally manufactured by dispersion or emulsion, and generally comprise about 25 to 60 weight % fluoropolymer in water, stabilized with a surfactant, wherein the fluoropolymer particles are approximately 0.1 to 0.3 micrometers in diameter. "Fine powder" (or "coagulated dispersion") fluoropolymers can be made by coagulation and drying of dispersion-manufactured fluoropolymers. Fine powder fluoropolymers are generally manufactured to have a particle size of approximately 400 to 500 micrometers. "Granular" fluoropolymers can be made by a suspension method, and are generally manufactured in two different particle size ranges, including a median particle size of approximately 30 to 40 micrometers, and a high bulk density product exhibiting a median particle size of about 400 to 500 micrometers. Pellets of fluoropolymer may also be obtained and cryogenically ground to exhibit the desired particle size.

Modulated differential scanning calorimetry (MDSC) methods can be used for determining extent of fibrillation of the fluoropolymer in the various compositions can be used to monitor the course and degree of fibrillation.

In one embodiment, the fluoropolymer is encapsulated by a rigid copolymer, e.g., a copolymer having a Tg of greater than 10° C. and comprising units derived from a monovinyl aromatic monomer and units derived from a $C_{3-6}$ monovinylic monomer.

Monovinylaromatic monomers include vinyl naphthalene, vinyl anthracene, and the like, and monomers of formula (2):

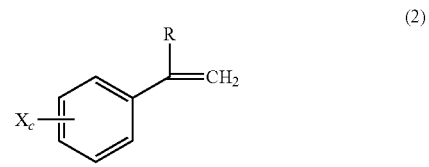

wherein each X is independently hydrogen, $C_1$-$C_{12}$ alkyl, $C_3$-$C_{12}$ cycloalkyl, $C_6$-$C_{12}$ aryl, $C_7$-$C_{12}$ arylalkyl, $C_7$-$C_{12}$ alkylaryl, $C_1$-$C_{12}$ alkoxy, $C_3$-$C_{12}$ cycloalkoxy, $C_6$-$C_{12}$ aryloxy, chloro, bromo, or hydroxy, c is 0 to 5, and R is hydrogen, $C_1$-$C_5$ alkyl, bromo, or chloro. Exemplary monovinylaromatic monomers that can be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetrachlorostyrene, and the like, and a combination comprising at least one of the foregoing compounds.

Monovinylic monomers include unsaturated monomers such as itaconic acid, acrylamide, N-substituted acrylamide or methacrylamide, maleic anhydride, maleimide, N-alkyl-, aryl-, or haloaryl-substituted maleimide, glycidyl(meth)acrylates, and monomers of the formula (3):

wherein R is hydrogen, $C_1$-$C_5$ alkyl, bromo, or chloro, and $X^c$ is cyano, $C_1$-$C_{12}$ alkoxycarbonyl, $C_1$-$C_{12}$ aryloxycarbonyl, hydroxy carbonyl, or the like. Examples of monomers of formula (3) include acrylonitrile, methacrylonitrile, alpha-chloroacrylonitrile, beta-chloroacrylonitrile, alpha-bromoacrylonitrile, acrylic acid, methyl(meth)acrylate, ethyl (meth)acrylate, n-butyl(meth)acrylate, t-butyl(meth)acrylate, n-propyl(meth)acrylate, isopropyl(meth)acrylate, 2-ethylhexyl(meth)acrylate, and the like, and a combination comprising at least one of the foregoing monomers. Monomers such as n-butyl acrylate, ethyl acrylate, and 2-ethylhexyl acrylate are commonly used. Combinations of the foregoing monovinyl monomers and monovinylaromatic monomers can also be used.

In a specific embodiment, the monovinylic aromatic monomer is styrene, alpha-methyl styrene, dibromostyrene, vinyltoluene, vinylxylene, butylstyrene, or methoxystyrene, specifically styrene and the monovinylic monomer is acrylonitrile, methacrylonitrile, methyl(meth)acrylate, ethyl (meth)acrylate, n-propyl(meth)acrylate, or isopropyl(meth) acrylate, specifically acrylonitrile. A useful encapsulated fluoropolymer is PTFE encapsulated in styrene-acrylonitrile (SAN), also known as TSAN.

Encapsulated fluoropolymers can be made by polymerizing the encapsulating polymer in the presence of the fluoropolymer, for example an aqueous dispersion of the fluoropolymer. Alternatively, the fluoropolymer can be pre-blended with a second polymer, such as an aromatic polycarbonate or SAN to form an agglomerated material. Either method can be used to produce an encapsulated fluoropolymer. The relative ratio of monovinyl aromatic monomer and monovinylic comonomer in the rigid graft phase can vary widely depending on the type of fluoropolymer, type of monovinylaromatic monomer(s), type of comonomer(s), and the desired properties of the composition. The rigid phase can comprise 10 to 95 wt. % of monovinyl aromatic monomer, specifically about 30 to about 90 wt. %, more specifically 50 to 80 wt. % monovinylaromatic monomer, with the balance of the rigid phase being comonomer(s). The SAN can comprise, for example, about 75 wt. % styrene and about 25 wt. % acrylonitrile based on the total weight of the copolymer. An exemplary TSAN comprises about 50 wt. % PTFE and about 50 wt. % SAN, based on the total weight of the encapsulated fluoropolymer.

The fluoropolymer can function as a melt strength enhancer. Other melt strength enhancers, including polymeric or non-polymeric material, can also be used. One class of melt strength enhancer includes but is not limited to semi-crystalline materials such as polyethylene terephthalate, poly(cyclohexanedimethylene terephthalate), poly(cyclohexanedimethylene terephthalate glycol), and poly(ethylene-co-1,4-cyclohexanedimethylene terephthalate). Another class of such melt strength enhancer includes high molecular weight polyacrylates. Examples of melt strength enhancers in this class include and are not limited to poly(methyl methacrylate) (PMMA), poly(methacrylate) (PMA), and poly(hydroxyethyl methacrylate). The fluoropolymer can be used in conjunction with the other melt strength enhancers. Alternatively, when the fluoropolymer is not used, combinations of different non-fluoropolymer melt strength enhancers can be used. When present, the non-fluoropolymer melt strength enhancers can be used in an amount from more than 0 to 40 wt. % (i.e., more than zero, up to and including 40 wt. %), based on the total weight of the thermoplastic composition. In another embodiment, the non-fluoropolymer melt strength enhancers can be used in an amount from 1 to 15% by weight, based on the total weight of the thermoplastic composition.

The fibrillated fluoropolymer is used in amounts, based on the total weight of the thermoplastic composition, from 0 to 2 wt. %, and more particularly from 0.1 to 2.0 wt %, and even more particularly from 0.1 to 1.0 wt % of the composition. In one embodiment, the fibrillated fluoropolymer is a polymer encapsulated fluoropolymer comprising poly(tetrafluoroethylene) encapsulated with styrene-acrylonitrile and is present in an amount ranging from 0.1 to 1.0 wt. %.

The thermoplastic composition can further comprise a stabilizer selected from the group consisting of thioether esters, hindered phenols, phosphites, phosphonites, phosphoric acid, and a combination thereof.

Exemplary phosphites include tris(2,6-di-tert-butylphenyl)phosphite, tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like.

Exemplary hindered phenols include alkylated monophenols or polyphenols; alkylated reaction products of polyphenols with dienes, such as tetrakis[methylene(3,5-di-tert-butyl-4-hydroxyhydrocinnamate)]methane, commercially available from Ciba Geigy Chemical Company as IRGANOX® 1010; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; octadecyl-3-(3,5-di-tert-butyl-4-hydroxyphenyl)propionate, pentaerythrityl-tetrakis[3-(3,5-di-tert-butyl-4-hydroxyphenyl)propionate, and esters of beta-(5-tert-butyl-4-hydroxy-3-methylphenyl)-propionic acid with monohydric or polyhydric alcohols.

Exemplary thioether esters include $C_{4-20}$ alkyl esters of thiodipropionic acid, including distearyl thiodipropionate, dilauryl thiodipropionate, and ditridecylthiodipropionate. U.S. Pat. Nos. 5,057,622 and 5,055,606 describe examples of thioether esters. Still other thioether ester stabilizers include $C_{4-20}$ alkyl esters of beta-laurylthiopropionic acid, including pentaerythritol tetrakis(beta-lauryl thiopropionate) available from Crompton Corporation under the trade name SEENOX™ 412S, and the like.

Exemplary phosphonites include tetrakis(2,4-di-tert-butylphenyl) 4,4'-biphenylene diphosphonite, which is available under the trade name SANDOSTAB® P-EPQ from Sandoz AG, and sold by Clariant; and tetrakis(2,4-di-tert-butylphenyl) 4,4'-biphenylene diphosphonite.

The stabilizers can be combined to form stabilizer compositions. An exemplary stabilizer composition comprises tetrakis(2,4-di-tert-butylphenyl) 4,4'-biphenylene diphosphonite and phosphoric acid in a weight ratio of 80:20 to 20:80, specifically 70:30 to 30:70 based on the weight of the stabilizer composition. The stabilizer composition can also consist essentially of, or consist of, tetrakis[methylene(3,5-di-tert-butyl-4-hydroxyhydrocinnamate)]methane and pentaerythritol-tetrakis(beta-lauryl thiopropionate), in a weight ratio of 30:60 to 70:30, specifically 40:60 to 60:40 based on total weight of the stabilizer composition.

The stabilizer composition is used in an amount ranging from more than 0 to 5 wt %, and more specifically 0.1 to 4.0 wt % and even more suitably 1.0 to 4.0 wt %, based on the total weight of the thermoplastic composition. In one embodiment the stabilizer composition comprises a stabilizer selected from the group consisting of thioether esters, hindered phenols, phosphites, phosphonites, phosphoric acid, and a combination thereof, wherein at least one of the foregoing stabilizers has a molecular weight of greater than 500 daltons. In other instances all of the stabilizer s will have molecular weight above 500 daltons. In one embodiment the stabilizer composition comprises at least 20 wt % thioether ester, based on the weight of the stabilizer composition, and at least one additional stabilizer selected from the group consisting of hindered phenols, phosphites, phosphonites, phosphoric acid, and a combination thereof. In one embodiment the thioether ester is a $C_{4-20}$ alkyl ester of thiodipropionic acid. In one embodiment the thioether ester is a $C_{4-20}$ alkyl ester of beta-laurylthiopropionic acid.

In general, the thermoplastic compositions comprise 51 to 90 wt. % of the high molecular weight polyester, 10 to 49 wt. % of the impact modifier, and from more than 0 to 5 wt % of a stabilizer. Within these general guidelines, the relative amounts of each component of the polyester composition will depend on the type and properties of the polyester, the type and properties (e.g., reactivity) of the impact modifier as well as the desired properties of the polyester composition.

For example, improved properties such as low temperature ductility and chemical resistance and low permeability can be obtained when the thermoplastic compositions comprise, based on the total weight of the composition, 51 to 90 wt. % of the above described polyester having a weight average molecular weight from 20,000 to 80,000 daltons (for example, PET and/or PBT), specifically 60 to 80 wt. % of the above described polyester having a weight average molecular weight from 20,000 to 80,000 daltons (for example, PBT).

Improved properties such as low temperature ductility and chemical resistance and low permeability can be obtained when the polyester compositions comprise, based on the total weight of the composition, 10 to 49 wt. % of the impact modifier (for example, a terpolymer comprising units derived from acrylonitrile, butadiene, and styrene), specifically 10 to 30 wt. % of the impact modifier (for example, a terpolymer comprising units derived from acrylonitrile, butadiene, and styrene).

The polyester composition can further comprise an optional catalyst and co-catalyst to facilitate reaction between the epoxy groups of the impact modifier and the polyester. If present, the catalyst can be a hydroxide, hydride, amide, carbonate, borate, phosphate, $C_{2-36}$ carboxylate, $C_{2-18}$ enolate, or a $C_{2-36}$ dicarboxylate of an alkali metal such as sodium, potassium, lithium, or cesium, of an alkaline earth metal such as calcium, magnesium, or barium, or other metal such as zinc or a lanthanum metal; a Lewis catalyst such as a tin or titanium compound; a nitrogen-containing compound such as an amine halide or a quaternary ammonium halide (e.g., dodecyltrimethylammonium bromide), or other ammonium salt, including a $C_{1-36}$ tetraalkyl ammonium hydroxide or acetate; a $C_{1-36}$ tetraalkyl phosphonium hydroxide or acetate; or an alkali or alkaline earth metal salt of a negatively charged polymer. Mixtures comprising at least one of the foregoing catalysts can be used, for example a combination of a Lewis acid catalyst and one of the other foregoing catalysts.

Specific exemplary catalysts include but are not limited to alkaline earth metal oxides such as magnesium oxide, calcium oxide, barium oxide, and zinc oxide, tetrabutyl phosphonium acetate, sodium carbonate, sodium bicarbonate, sodium tetraphenyl borate, dibutyl tin oxide, antimony trioxide, sodium acetate, calcium acetate, zinc acetate, magnesium acetate, manganese acetate, lanthanum acetate, sodium benzoate, sodium stearate, sodium benzoate, sodium caproate, potassium oleate, zinc stearate, calcium stearate, magnesium stearate, lanthanum acetylacetonate, sodium polystyrenesulfonate, the alkali or alkaline earth metal salt of a PBT-ionomer, titanium isopropoxide, and tetraammonium hydrogensulfate. Mixtures comprising at least one of the foregoing catalysts can be used.

The polyester compositions can include various additives ordinarily incorporated into resin compositions of this type, with the proviso that the additives are selected so as to not significantly adversely affect the desired properties of the thermoplastic composition. Exemplary additives include other polymers (including other impact modifiers), fillers, antioxidants, thermal stabilizers, light stabilizers, ultraviolet light (UV) absorbing additives, quenchers, plasticizers, lubricants, mold release agents, antistatic agents, visual effect additives such as dyes, pigments, and light effect additives, flame retardants, anti-drip agents, and radiation stabilizers. Combinations of additives can be used. The foregoing additives (except any fillers) are generally present in an amount from 0.005 to 20 wt. %, specifically 0.01 to 10 wt. %, based on the total weight of the composition.

Other polymers that can be combined with the polyesters include polycarbonates, polyamides, polyolefins, poly(arylene ether)s, poly(arylene sulfide)s, polyetherimides, silicones, silicone copolymers, $C_{1-6}$ alkyl(meth)acrylate polymers (such as poly(methyl methacrylate)), and $C_{1-6}$ alkyl (meth)acrylate copolymers, including other impact modifiers. Such polymers are generally present in amounts of 0 to 10 wt. % of the total composition.

The composition can contain fillers. Particulate fillers include, for example, alumina, amorphous silica, anhydrous alumino silicates, mica, wollastonite, barium sulfate, zinc sulfide, clays, talc, and metal oxides such as titanium dioxide, carbon nanotubes, vapor grown carbon nanofibers, tungsten metal, barites, calcium carbonate, milled glass, flaked glass, ground quartz, silica, zeolites, and solid or hollow glass beads or spheres, and fibrillated tetrafluoroethylene. Reinforcing fillers can also be present. Suitable reinforcing fillers include fibers comprising glass, ceramic, or carbon, specifically glass that is relatively soda free, more specifically fibrous glass filaments comprising lime-alumino-borosilicate glass, which are also known as "E" glass. The fibers can have diameters of 6 to 30 micrometers. The fillers can be treated with a variety of coupling agents to improve adhesion to the polymer matrix, for example with amino-, epoxy-, amido- or mercapto-functionalized silanes, as well as with organometallic coupling agents, for example, titanium or zirconium based compounds. Fillers, however, can impair the ductility properties and are used sparingly in some embodiments. In one embodiment, the fillers are present in an amounts from 0, or more than 0 to less than 30 weight percent, based on the total weight of the composition. In one embodiment the filler is present in an amount of 5 to 30 weight percent of the total weight of the composition, and is selected from the group consisting of glass fibers, glass flakes, glass beads, milled glass, silica, wollastonite, talcs, clay, nanoclays, and a combination thereof.

The physical properties of the thermoplastic composition (or an article derived from the composition) can be varied, depending on properties desired for the application. In an advantageous embodiment, articles molded from the compositions have a combination of good low temperature impact properties and chemical resistance, particularly resistance to liquid fuel. Liquid fuel as used herein includes fuels such as gasoline. Also included are fuels that contain at least 10, up to 20, up to 40, up to 60, up to 80, or even up to 90 volume percent of a $C_{1-6}$ alcohol, in particular ethanol and/or methanol. A mixture of ethanol and methanol is also included. In one embodiment, a liquid fuel comprises 10 to 90 volume % of regular gasoline and 10 to 90 volume % of a $C_1$-$C_6$ alcohol.

In one embodiment the composition has an MVR (melt volume flow rate) of 1 to 20 cc/10 min., measured in accordance with ASTM D1238 at 265° C., a flexural modulus of greater than 1300 MPa, measured in accordance with ASTM D790, and retains at least 75% of its initial tensile elongation at break, as measured by ASTM D638, after exposure to Fuel E85 for 28 days at 70° C.

In one embodiment, a bar having a thickness ranging from 2 to 6 mm and cut from a blow molded article comprising the composition has (1) a multi-axial impact total energy from 30 to 100 Joules at −30° C., measured in accordance with ASTM D3763, and (2) a ductility of at least 50%, measured in accordance with ASTM D3763

In one embodiment the thermoplastic composition has a heat distortion temperature at 66 psi (0.45 MPa) of greater than or equal to 75° C.

In one embodiment, an article comprising the composition, in particular an injection molded article, has a ductility in a multi-axial impact test of greater than 50%, measured with 3.2 mm thick disks at −30° C. in accordance with ASTM D3763. An article comprising the composition, in particular an injection molded article, can also have a ductility in a multi-axial impact test of greater than or equal to 50%, measured with 3.2 mm thick disks at −40° C. in accordance with ASTM D3763.

In another embodiment, a blow molded article comprising the composition has a ductility in a multi-axial impact test of greater than or equal to 90%, measured at −30° C. in accordance with ASTM D3763 using a sample that is 8.9 cm (3.5 inches) square that has been cut out from the article. A blow molded article comprising the composition can also have a ductility in a multi-axial impact test of greater than or equal to 50%, measured at −30° C. in accordance with ASTM D3763, using a sample that is 8.9 cm (3.5 inches) square that has been cut out from the article.

The compositions can further be formulated such that both an injection molded article and a blow molded article can have the above-described ductilities at −30° C. and/or at −40° C.

The compositions can also be formulated such that a molded article comprising the composition has a multi-axial impact total energy of greater than or equal to 23 Joules (J) measured with 3.2 mm thick disks at −40° C. in accordance with ASTM D3763. In one embodiment the multi-axial impact total energy ranges from 30 to 100 Joules at −30° C. in accordance with ASTM D3763. In one embodiment the multi-axial impact total energy ranges from 30 to 100 Joules at 23° C. in accordance with ASTM D3763.

Resistance to a liquid fuel is most conveniently determined by measuring the molecular weight of a sample of the polyester composition before and after exposure to the liquid fuel or a mixture of solvents representative of a liquid fuel. Here, an article molded from the composition, for example an ASTM tensile bar of 3.2 mm thickness, retains 50% or more of its initial weight average molecular weight after exposure to a solvent composition comprising gasoline with a minimum octane rating of 87 for 500 hours at 70° C. In addition, an article molded from the composition, for example an ASTM tensile bar of 3.2 mm thickness can retain 50% or more of its initial weight average molecular weight after exposure to a solvent composition comprising 85 volume % ethanol and 15 volume % gasoline for 500 hours at 70° C.

In a particularly advantageous embodiment, the fuel permeation of an article molded from the composition, e.g., an article having a nominal wall thickness from 1.5 mm to 3.5 mm can be less than or equal to 1.5 g/m² per day when the article is exposed to a fuel composition for 24 hours at 40° C. after equilibrium is achieved at 40° C. In one embodiment, the fuel is an alcohol-based gasoline having 10 volume % or more of the alcohol, specifically ethanol. In still another embodiment, the fuel composition that is compliant with Phase II California Reformulated Certification fuel (CERT). In one embodiment the article has a permeability of more than 0 and less than or equal to 1.5 g/m2-day to ASTM D 471-98 Fuel C measured after exposure to ASTM D 471-98 Fuel C vapor for 20 weeks at 40° C. using a disc having a diameter of 22 mm and a thickness of 2 mm.

In a more specific embodiment, the thermoplastic composition comprises from 60 to 80 wt % of the polyester; from 10 to 30 wt % of the acrylonitrile-butadiene-styrene impact modifier composition, from 0.1 to 20 wt % of the multifunctional epoxy compound, wherein the multifunctional epoxy compound is selected from the group consisting of dicycloaliphatic diepoxy compounds or terpolymers comprising units derived from the reaction of ethene, a $C_{1-6}$ alkyl(meth)acrylate, and glycidyl(meth)acrylate; from 0.1 to 2 wt % of the fibrillated fluoropolymer; and from 0.1 to 4 wt % of the stabilizer composition. In one embodiment, the stabilizer composition comprises at least 20 wt % of a $C_{4-20}$ alkyl ester of thiodipropionic acid, based on the weight of the stabilizer composition, and at least one additional stabilizer selected from the group consisting of hindered phenols, phosphites, phosphonites, phosphoric acid, and a combination thereof, and wherein a blow molded sample of the composition has a multi-axial impact total energy from 30 to 100 Joules at −30° C., measured in accordance with ASTM D3763. In one embodiment the polyester is poly(1,4-butylene terephthalate). In one embodiment the composition does not contain a polyester selected from the group consisting of poly(ethylene terephthalate)s, poly(1,3-propylene terephthalate)s, poly(cyclohexanedimethanol terephthalate)s, poly(cyclohexanedimethylene terephthalate)-co-poly(ethylene terephthalate)s, and a combination thereof.

In an even more specific embodiment, a thermoplastic composition comprises from 60 to 80 wt % poly(1,4-butylene terephthalate); from 10 to 30 wt % of the acrylonitrile-butadiene-styrene impact modifier composition; from 0.1 to 20 wt % a terpolymer comprising units derived from the reaction of ethene, a $C_{1-6}$ alkyl(meth)acrylate, and glycidyl(meth)acrylate; from 0.1 to 2 wt % poly(tetrafluoroethylene) encapsulated with styrene-acrylonitrile; and from 0.1 to 4 wt % of the stabilizer composition. In one embodiment, the stabilizer composition comprises at least 20 wt % of a $C_{4-20}$ alkyl ester of beta-laurylthiopropionic acid, based on the weight of the stabilizer composition, and at least one additional stabilizer selected from the group consisting of hindered phenols, phosphites, phosphonites, phosphoric acid, and a combination thereof, and wherein a blow molded article of the composition has a multi-axial impact total energy from 30 to 100 Joules at −30° C., measured in accordance with ASTM D3763.

The polyester compositions are manufactured by combining the various components under conditions effective to form reaction products. For example, powdered polyester, impact modifier, stabilizer, and/or other optional components are first blended, optionally with fillers in a HENSCHEL-Mixer® high speed mixer. Other low shear processes, including but not limited to drum tumbling, vee blender or hand mixing, can also accomplish this blending. The blend is then fed into the throat of a twin-screw extruder via a hopper. Alternatively, one or more of the components can be incorporated into the composition by feeding directly into the extruder at the throat and/or downstream through a side-stuffer. Additives can also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

The polyester compositions can be formed into shaped articles by a variety of known processes for shaping molten polymers, such shaping, extruding, calendaring, thermoforming, casting, or molding the compositions. Molding includes injection molding, rotational molding, compression molding, blow molding, and gas assist injection molding.

The compositions are particularly useful for the manufacture of articles that are exposed to fuels, e.g., fuel tanks, fuel containers, and other components that are exposed to a fuel such as gasoline. In one embodiment, such articles are blow molded and retain their advantageous low temperature ductility, chemical resistance, and low fuel permeation.

Examples of other articles include electrical connectors, enclosures for electrical equipment, e.g., a battery cover, automotive engine parts, components for electronic devices, lighting sockets and reflectors, electric motor parts, power distribution equipment, communication equipment, tiles, e.g., decorative floor tiles.

In one embodiment, the blow molded article is a fuel tank wherein after storage of ASTM E85 fuel for 28 days at 70° C., the composition retains at least 75% of its initial tensile elongation at break, as measured by ASTM D638. In one embodiment at least a portion of the article is hollow, and the article has a liquid capacity from 0.47 liter (1 pint) to 18.9 liters (5 gallons). In one embodiment, the blow molded article has a minimum wall thickness from 1 to 10 millimeters.

In one embodiment, the injection molded article is a fuel tank is a fuel tank, wherein after storage of ASTM E85 fuel for 28 days at 70° C., the composition retains at least 75% of its initial tensile elongation at break, as measured by ASTM D638.

In one embodiment the thermoplastic composition comprises a stabilizer composition comprising at least 20 wt % of a thioether ester, based on the weight of the stabilizer composition, and at least one additional stabilizer selected from the group consisting of hindered phenols, phosphites, phosphonites, phosphoric acid, and a combination thereof; wherein the thermoplastic composition has a ratio of melt viscosity at a shear rate of 50 $s^{-1}$ to a melt viscosity at a shear rate of 4000 $s^{-1}$, of 6 to 12, measured at 265° C. in accordance with ASTM D3835; and wherein a blow molded sample of the composition has a multi-axial impact total energy ranging from 30 to 100 Joules at −30° C., measured in accordance with ASTM D3673.

Processes of forming articles comprising the compositions are also disclosed. In one embodiment, a process for blow molding a fuel tank comprises heating a thermoplastic composition in a screw-driven melt processing device to a temperature of 230 to 300° C. to form a molten composition; pushing the molten composition through an orifice to create an annular tube of the molten thermoplastic composition; closing off an end of the annular tube to form a closed end annular tube; encasing the closed ended annular tube in a mold; blowing a gas into the closed ended annular tube while the thermoplastic composition is above the crystallization temperature of the composition, until the closed ended tube assumes the shape of the mold to form a shaped tube; and cooling the shaped tube to temperature below the crystallization temperature of the thermoplastic composition to form the article wherein the composition comprises from 51 to 90 wt % of a polyester having a weight average molecular weight from 20,000 to 80,000 daltons, a carboxylic acid end group content from 5 to 50 meq/Kg, and a melting point (Tm) temperature from 200 to 285° C., in some instances the polyester can have a crystallization, or solidification temperature (Tc) from 120 to 190° C., wherein the polyester is selected from the group consisting of poly(ethylene terephthalate)s, poly(1,4-butylene terephthalate)s, poly(1,3-propylene terephthalate)s, poly(cyclohexanedimethanol terephthalate)s, poly(cyclohexanedimethylene terephthalate)-co-poly(ethylene terephthalate)s, and a combination thereof; from 10 to 49 wt % of an acrylonitrile-butadiene-styrene impact modifier composition having an average particle size from 50 to 800 micrometers, a gel content of at least 50 wt %, and a polybutadiene content of at least 50 wt % of the impact modifier composition; from 0 to 20 wt % of a multifunctional epoxy compound; from 0 to 40 wt % of a filler; from 0 to 2 wt % of a fibrillated fluoropolymer; and from more than 0 to 5 wt % of a stabilizer composition, wherein the stabilizer composition comprises at least 20 wt % thioether ester, based on the weight of the stabilizer composition, and at least one additional stabilizer selected from the group consisting of hindered phenols, phosphites, phosphonites, phosphoric acid, and a combination thereof; wherein each of the foregoing stabilizers has a molecular weight of greater than 500 daltons; and wherein a blow molded article of the composition has a multi-axial impact total energy from 30 to 100 Joules at −30° C., measured in accordance with ASTM D3763.

In one embodiment, the above described process further comprises blowing a gas into the closed ended annular tube comprising the composition until the closed ended tube has an outer diameter that is greater than or equal to 1.3 times the outer diameter of the annular tube.

Advantageously, our invention now provides previously unavailable benefits. The polyester compositions of our invention, and the articles made from them, for instance, exhibit a highly useful combination of performance properties, namely improved low temperature ductility, good chemical resistance, and permeability. Our compositions can include different combination of components and can provide a wide array of performance properties useful in many applications. The compositions, and the articles made from the compositions, can exhibit good ductility, low permeability, and resistance to gasoline and short chain alcohols. These properties are especially useful for the manufacture of articles such as fuel tanks and containers for gasoline and are well positioned to address new regulatory standards. Compositions of our invention perform well when subjected to blow molding processes-processes that have typically compromised the performance of compositions used in injection molding processes. In fact, the above-mentioned useful combination of properties can be achieved regardless whether or not the compositions are blow molded or injection molded to form articles, thereby providing effective solutions needed by many manufacturers.

The polyester compositions are further illustrated by the following non-limiting examples. The amounts of all components in the Tables below are provided in percent by weight, based on the total weight of the blend components.

EXAMPLES 1-11

Materials

Polybutylene terephthalate (PBT) was VALOX brand from SABIC Innovative Plastics, Mw=36,500. Intrinsic viscosity measured in 60:40 phenol:tetrachloro ethane was 1.2 cc/g. Meting point (Tm) was 222° C. Carboxylic acid (COOH) end group concentration was 45 mille equivalents per kilogram PBT (Meq./Kg) resin. TSAN was a 50/50 wt % blend of a fibrillating poly tetra fluoro ethylene (PTFE) co-precipitated with polystyrene acrylonitrile (SAN), from SABIC Innovative Plastics.

Hindered phenol antioxidant was octadecyl-3-(3,5-di tert butyl-4-hydroxy phenyl)propionate, also know as IRGANOX 1076, from Ciba Specialty Chemicals, Mw=about 531. The phosphite antioxidant was ULTRANOX 626 a bis(2,4-di tert butylphenyl)pentaerythritol diphosphite from Chemtura Co. Mw=about 604. UVA was a benzotriazole UV stabilizer, TINUVIN 234, from Ciba Specialty Chemicals, Mw=about 447. The thio ester stabilizer was a low odor pentaerythritol beta lauryl thiopropionate, SEENOX 412S, from Clariant Co., Mw=about 1160. Polycarbonate (PC) was LEXAN 100 resin from SABIC Innovative Plastics, Mw=about 29,900, Tg=about 150° C.

A set of rubbery butadiene based impact modifiers was used in the polyester blends. SG24 is a high butadiene content ABS from Ube Cycon Ltd. BLENDEX 338 ABS and VHRG-ABS rubbers were from SABIC Innovative Plastics. The methyl methacrylate butadiene styrene (MBS) rubber was EXL3691 from Rohm and Hass Co. The approximate composition, particle size, gel content, ungrafted SAN content and molecular weight are shown in Table 1.

TABLE 1

| Rubber Modifier | average particle size | % gel/ insolubles | % Acrylo- nitrile | % Styrene | % Butadiene | % MMA | % Free SAN | Mw Free SAN |
|---|---|---|---|---|---|---|---|---|
| Blendex 338 | 310 nm | 93 | 7 | 24 | 69 | 0 | 7 | 98000 |
| SG24 | 260 nm | 87 | 9 | 25 | 66 | 0 | 13 | 62000 |
| VHRG | 310 nm | 90 | 9 | 26 | 62 | 3 | 10 | 94000 |
| MBS EXL3691 | 175 nm | >75 | 0 | 12 | 75 | 13 | 0 | na |

Techniques and Procedures
Compounding Conditions:

The ingredients were tumble-blended and then extruded on a compounding 27 mm vacuum vented Werner Pfleiderer twin screw extruder with a co-rotating mixing screws. The temperature was set at 520° F. (271° C.) and screw speed at 300 rpm. The output rate on this line is about 50 lbs/hr. The extrudate was cooled through a water bath prior to pelletizing.

Molding Conditions:

Injection molded samples: Test parts were injection molded on a Van Dorn molding machine (80T) with a set temperature of approximately 500° F. (260° C.) using a 30 second cycle time. The pellets were dried for 3-4 hours at 170° F. (77° C.) in a forced air-circulating oven prior to injection molding.

Blow molded samples: The samples were extrusion blow molded on a APV blow molding machine with a accumulator type of processor. The machine had a 2.5-inch diameter screw which has a Sterlex II Barrier Flight screw design and with a barrel length/diameter ratio of 24/1. The drive motor is 50 horsepower. The accumulator design is spiral flow and has a capacity of 2.5 lb of standard LEXAN 100 resin. The die diameter was 2 inches and the machine had a clamp force of 30 US tons. The melt temp of resin during blow molding was set at 500° F. (260° C.). During the blow molding process, the extruded molten polymer tube was expanded into a hollow rectangular staircase shape where the smallest distance between opposing sides was 2, 4 and 6 inches (5.1, 10.2, and 15.2 cm). The part blow molded was a hollow rectangular three-step tool part 11.5 (29.2 cm) inches high and 6 inches (15.2 cm) wide. The height (rise) of the steps is 3.5, 4 and 4 inches respectively (8.9, 10.2, and 10.2 cm). The inside depth of the three steps was 2, 4 and 6 inches (5.1, 10.2, and 15.2 cm). The expansion ratio with regard to width was 3.0 (2 inches to 6 inches (5.1 to 15.2 cm)), with regards to depth the first step had no expansion, the second step expansion ratio was 2.0 (2 to 4 inches (5.1 to 10.2 cm)) the third step, furthest from the extruder, has a 3.0 expansion ratio of 2 to 6 inches (5.1 to 15.2 cm). Larger expansion ratios are also possible.

A cut out from the extrusion blow-molded part (3.5 inches× 3.5 inches) was taken from the flat side of the middle step for multiaxial impact testing.

Mechanical Property Testing:

Multiaxial impact testing (MAI) is based on the ASTM method D3763. This procedure provides information on how a material behaves under multiaxial deformation conditions. The deformation applied is a high-speed puncture. An example of a supplier of this type of testing equipment is DYNATUP. Properties reported include total energy absorbed (TE), which is expressed in Joules (J) and ductility of parts in percent (% D) based on whether the part fractured in a brittle or ductile manner. A ductile part showed yielding where it was penetrated by the tup, a brittle part split into pieces or had a section punched out that showed no yielding.

The reported test result is calculated as the average of ten test plaques for blow molded parts and five test plaques for injection-molded parts.

Flexural modulus was measured on 127×12.7×3.2 mm bars using ASTM method D 790. Flexural strength is reported at yield. Tensile strength was measured on 3.2 mm tensile bars with a 50 mm/min. crosshead speed using ASTM method D638, tensile strength is reported at yield (Y), percent elongation is reported at break (B).

HDT was measured on 127×3.2 mm bars using ASTM method D648 with a 0.445 MPa (66 psi) or 1.82 MPa (264 psi) load. Part were not annealed before testing.

Melting point (Tm) was measured using differential scanning calorimetry (DSC) in a method similar to ASTM D3418. The peak Tm was recorded on the second heat, heating rate was 20° C./min.

Molecular weight was determined by gel permeation chromatography (GPC). A Waters 2695 separation module equipped with a single PL HFIP gel (250×4.6 mm) and a Waters 2487 Dual Wavelength Absorbance Detector (signals observed at 273 nm) were used for GPC analysis. Typically, samples were prepared by dissolving 50 mg of the polymer blends in 50 mL of 5/95 volume % hexafluoro isopropyl alcohol/chloroform solution. The results were processed using a millennium 32 Chromatography Manager V 4.0 Reported molecular weights are relative to polystyrene standards. As used herein, "molecular weight" refers to weight average molecular weight (Mw).

Melt volume rate (MVR) was measured as per ASTM method D1238 at 265° C. with a 5 Kg load on samples dried for 2 to 3 hrs. at 110° C. A 6 minute equilibration was used before data was collected. MVR is reported in cubic centimeters (cc) of polymer melt/10 minutes. Viscosity vs. shear rate was measured on pellets dried 2 to 3 hrs. at 125° C. using ASTM method D3835 using a capillary rheometer. The polymer melt was held at a constant temperature as the shear rate was varied from 20 to 7000 sec.$^{-1}$. The melt viscosity, measured in Pascal-seconds (Pa-s) was recorded at a low shear rate, for example 50 sec.$^{-1}$ and compared to the viscosity at a high rate of shear, for example 4000 sec.$^{-1}$. A high ratio indicates, (>7) good shear thinning behavior and high melt strength. High melt strength is especially important in extrusion blow molding large parts (>2 kg) so that the molten parison can hold its weight while being expanded into the blow molded article.

Fuel Permeation Testing:

This procedure is based on "Fuel Permeation Performance of Polymeric Materials" SAE Technical Paper 2001-01-1999; M. Nulmanl et al.

Material used for Permeation testing: An oven capable of holding 40° C.±1° a permeability chamber designed to introduce fuel on the bottom then allow it to volatilize across the plastic part, ASTM Fuel CE10 a Carbotrap C and Carbosieve S-III trap, nitrogen purge, a dual gas flow regulator with quick disconnects a gas calibration standard, Gas Chromatograph (GC)/Mass spectrometer (MS) with thermal desorption unit, a gas flow meter and a stopwatch. A 1.6 mm plastic specimen was exposed to ASTM Fuel CE10 vapor on one side and the content of the permeated vapor on the other side of the sample measured. The exposure is conducted in specially sealed chambers. The permeated gases were captured on a thermal desorption trap. The composition of permeated gases is identified using a thermal desorption unit and a GC/MS system. In terms of actual test procedure, 5 mL of the ASTM Fuel CE10 is placed in the permeation chamber. A polymer disc 22 mm in diameter and 1.6 mm thick is placed between Teflon O-rings. The top of the chamber is then bolted down. The inlet is connected to a nitrogen purge with a flow setting between 20 and 30 cc/min. This allows for proper gas turnover. At the given times of interest, the flow is stopped, and a thermal desorption trap is connected to the outlet of the permeation chamber. Timing and flow are started simultaneously at this time. The trap time varied based on the barrier properties of the material and/or the sensitivity required. The trap material used is of two types: Carbotrap C used to trap hydrocarbons and not ethanol, while Carbosieve SIII is good for retaining ethanol but not hydrocarbons. A mixture of the two allows for the analysis of all target compounds. An Agilent/CDS system that has a thermal desorption unit was used to quantify the volatiles trapped as described in the section above. Fuel permeability was tested over 20 days and is reported as total permeation ($g/m^2$-day).

Chemical Resistance Measurements:

The chemical resistance of the samples was evaluated by immersing the standard parts such as a tensile bar in the corresponding fuel to be tested. If the resistance against E85 is determined, the fuel for the experiment was obtained by mixing 85 volume percent of ethanol with 15 volume percent of gasoline with a knocking (octane) rating of 87. The samples immersed in the test fuel were loaded into glassware set up and sealed with a lid that has two open ports to connect the reflux condenser with water circulation and a thermometer for measuring the temperature. The constant temperature for the experiment was obtained by immersing the set up in a silicone oil bath that is heated using a standard lab heater plate with magnetic stirrer. Initial molecular weight was recorded for each sample using GPC. A sample was pulled out after predefined intervals to determine or molecular weight by GPC. The relative performance of various samples was determined using the retention in molecular weight compared to unexposed sample. Retention of tensile properties on exposure was determined in a similar manner by exposing molded bars to fuel and testing properties after various periods of exposure.

EXAMPLES 1-7

Compositions shown in Table 2 were made and tested in accordance to the procedures described above using PBT/ABS blends. The results of Examples 1-7 are summarized in Table 2.

TABLE 2

|  | 1 | 2 | 3 | 4 | 5 | 6 | 7 |
|---|---|---|---|---|---|---|---|
| PBT 315 | 68.8 | 68.8 | 78.8 | 73.8 | 68.8 | 68.8 | 67.70 |
| TSAN | 0.25 | 0.25 | 0.25 | 0.25 | 0.25 | 0.25 | 0.25 |
| BLX 338 | 30 | 30 | 25 | 20 |  |  |  |
| SG24 |  |  |  |  | 30 | 30 | 30 |
| Thio Ester | 0.20 | 1.50 | 1.50 | 1.50 | 0.20 | 1.50 | 1.00 |
| Hindered Phenol | 0.30 | 0.75 | 0.75 | 0.75 | 0.30 | 0.75 | 0.40 |
| Phosphite | 0.20 | 0.75 | 0.75 | 0.75 | 0.20 | 0.75 | 0.40 |
| UVA | 0.25 | 0.25 | 0.25 | 0.25 | 0.25 | 0.25 | 0.25 |
| Properties of Injection Molded Sample |  |  |  |  |  |  |  |
| MVR 265 C. cc/10 min | 5.9 | 5.9 | 17 | 13.1 | 9.9 | 9.1 | 4.2 |
| MAI −50 C. TE J (% D) | 53 (100%) | 57 (100%) | 63 (100%) | 65 (100%) | 62 (100%) | 64 (100%) | 57 (100%) |
| MAI −60 C. TE J (% D) | 55 (100%) | 61 (100%) | 68 (100%) | 70 (100%) | 57 (100%) | 62 (100%) | 61 (100%) |
| Flex Str. MPa | 46.8 | 50.1 | 56.3 | 61.4 | 51.6 | 54.0 | 46.8 |
| Flex Mod. MPa | 1430 | 1550 | 1700 | 1840 | 1570 | 1610 | 1440 |
| T Str (Y) MPa | 31.1 | 32.8 | 36.3 | 39.0 | 31.5 | 34.5 | 31.5 |
| % Elong (B) | 236 | 252 | 250 | 311 | 208 | 292 | 268 |
| HDT 66 psi C. | 75 | 88 | 99 | 114 | 88 | 90 | 80 |
| Properties of Blow Molded Sample |  |  |  |  |  |  |  |
| MAI −30 C. TE J (% D) | 46 (10%) | 56 (100%) | 58 (100%) | 39 (77%) | 56 (80%) | 49 (100%) |  |
| MAI −40 C. TE J (% D) | 22 (0%) | 48 (90%) | 53 (60%) | 32 (100%) | 42 (10%) | 47 (90%) | 54 (100%) |

The examples (1 to 7) in Table 2 show PBT resin blends with 20 to 30 wt % ABS rubbery modifier BLX338 or SG24, antioxidants, an ultra violet screener (UVA) and a PTFE/SAN modifier. Note that the injection molded samples of all the blends have ductile multiaxial impact (MAI) failure and high total energy (>50 J) at −50 and −60° C. The blends also have good rigidity with a flexural modulus above 1300 MPa. Heat resistance under load, as measured by HDT at 66 psi, is above 75° C. for all blends. Note that under the more demanding extrusion blow molding conditions only blends 2, 3, 4, 6 and 7, with a greater than 0.3 wt % thio ester gave greater than 50% ductility at −30 or −40° C. Use of this high molecular weight pentaerythritol thioester, Mw=about 1178, not only gave blow molded articles with good ductility at low temperature, but even at 1.5 wt % loading, had low odor with no objectionable mercaptan or "sulfur" odor observed during melt processing by compounding, injection molding or blow molding.

EXAMPLES 8-10

Compositions shown in Table 3 were made and tested in accordance to the procedures described above using results of Examples 8-10 are summarized below in Table 3.

TABLE 3

|  | 8 | 9 | 10 |
|---|---|---|---|
| PBT 315 | 78.22 | 78.22 | 78.22 |
| TSAN | 1.00 | 1.00 | 1.00 |
| MBS | 20 | 10 |  |
| VHRG ABS |  | 10 | 20 |
| Thio Ester | 0.30 | 0.30 | 0.30 |
| Hindered Phenol | 0.10 | 0.10 | 0.10 |
| Phosphite | 0.03 | 0.03 | 0.03 |
| UVA | 0.25 | 0.25 | 0.25 |
| Properties of Injection Molded Sample |  |  |  |
| MVR 265 C. cc/10 min | 14.8 | 18.2 | 15.6 |
| MAI −30 C. TE J (% D) | 57 (100%) | 69 (100%) | 69 (100%) |
| MAI −40 C. TE J (% D) | 52 (100%) | 68 (100%) | 66 (100%) |
| MAI −50 C. TE J (% D) | 26 (20%) | 59 (20%) | 76 (100%) |
| Flex Str. MPa | 60.1 | 66.5 | 70.8 |
| Flex Mod. MPa | 1770 | 2020 | 2210 |
| T Str (Y) MPa | 39.2 | 42.8 | 45.5 |
| % Elong (B) | 130 | 181 | 350 |
| HDT 264 psi C | 60 | nr | 51 |
| Properties of Blow Molded Sample |  |  |  |
| MAI −30 C. TE J (% D) | 31 (0%) | 38 (0%) | 35 (0%) |
| MAI −40 C. TE J (% D) | 23 (0%) | 36 (0%) | 28 (0%) |

Discussion of Results

Table 3 shows additional examples (8 to 10) of impact modified PBT blends. Comparative example 8, using 20% of a high butadiene rubber MBS modifier in place of a high butadiene (>50 wt %) content ABS rubbers of example 4 of Table 1, shows inferior MAI at −50° C. with only 20% ductility in injection molded samples. A blend with 10% MBS and 10% HRG-ABS (Ex. 9) has moderately better impact than example 8, but is inferior to the 20% HRG-ABS (Ex. 10). With low thioester content examples 9 and 10 blow molded samples show poor ductility and low MAI at −30 and −40° C.

COMPARATIVE VISCOSITY ANALYSIS OF EXAMPLES 2, 6, AND 7

The viscosity performance at high and low shear of compositions of Examples 2, 6, and 7 was evaluated in accordance to the procedures described above. Table 4 shows the results.

TABLE 4

| | High and Low Shear Viscosity | | |
|---|---|---|---|
| Example | Shear Viscosity (Pa-s) at 50 sec −1 at 250° C. | Shear Viscosity (Pa-s) at 4000 sec −1 at 250° C. | Ratio of shear viscosity at 50 to 4000 sec −1 |
| 2 | 1460 | 152 | 9.6 |
| 6 | 1442 | 138 | 10.4 |
| 7 | 1704 | 152 | 11.2 |

Discussion of Results

The high melt strength needed for blow molding large parts is illustrated in the Theological data of Table 4. Examples 2, 6, and 7 with 30 wt % high butadiene content ABS show good melt strength as evidenced by a ratio of high shear viscosity (4000 sec.$^{-1}$) to low shear viscosity (50 sec.$^{-1}$) at 250° C. of from 9.6 to 11.2. The PBT-SG24 blend (Ex. 6 and 7) having a higher viscosity ratio than the PBT-BLX338 blend (Ex. 2).

EXAMPLE 11 (COMPARATIVE)

The composition shown in Table 5 comprising a PC/PBT blend was made and tested in accordance to the procedures described above. The results of Example 11 are summarized below in Table 5.

TABLE 5

| PC-PBT Blend | |
|---|---|
|  | 11 (Comparative) |
| PBT 315 | 66.32 |
| PC 100 | 15 |
| MBS | 18 |
| Thio Ester | 0.05 |
| Hindered Phenol | 0.08 |
| mono sodium phosphate | 0.30 |
| UVA | 0.25 |
| Properties of Injection Molded Sample |  |
| MVR 265 C. cc/10 min | 17.9 |
| MAI −40 C. TE J (% D) | 71 (100%) |
| MAI −50 C. TE J (% D) | 70 (100%) |
| MAI −60 C. TE J (% D) | 67 (100%) |
| Flex Str. MPa | 66.4 |
| Flex Mod. MPa | 1860.0 |
| T Str (Y) MPa | 43.5 |
| % Elong (B) | 212 |
| HDT 264 psi C | 98 |
| Properties of Blow Molded Sample |  |
| MAI −40 C. TE J (% D) | 4 (0%) |

Discussion of Results

Comparative Example 11 is an impact modified polycarbonate PBT blend. Table 5 shows the properties of an 18% MBS modified PC-PBT composition. The injection molded parts show good ductility from −40 to −60° C. With the low thioester content blow molded parts gave brittle failure and very low MAI values at −40° C.

COMPARATIVE PERMEABILITY ANALYSIS OF EXAMPLES 7 AND 11

The permeability of compositions of Examples 7 and 11 was evaluated in accordance to the procedures described above. Table 6 shows the results.

TABLE 6

| | Permeability |
|---|---|
| Example | Total Permeation (g/m$^2$-day) for 1.6 mm disk 20 weeks |
| 7 | 0.34 |
| 11 (Comparative) | 1.35 |

Discussion of Results

The PC/PBT blend shows relative deficiency in terms of fuel permeability. Table 6 shows the fuel permeability of a 22×1.6 mm sample of example 7 (PBT/ABS) and example 112 (PC/PBT). Example 11 with only 15% PC has about 4 times worse ASTM fuel CE10 permeability than the PBT/ABS blend example 7. Articles made of the PBT/ABS blend will have lower loss of fuel making more efficient use of the fuel and reducing atmospheric pollution.

COMPARATIVE FUEL RESISTANCE ANALYSIS OF EXAMPLES 7 AND 11

The fuel resistance of compositions of Examples 7 and 11 was evaluated in accordance to the procedures described above using E85 fuel. Table 7 shows the results.

TABLE 7

| Example | 0 Days | 7 Days | 14 Days | 21 Days | 28 Days |
|---|---|---|---|---|---|
| % Tensile Elongation at Break after Exposure to E85 at 70° C. | | | | | |
| 7 | 223 | 219 | 220 | 224 | 202 |
| 11 Comparative) | 257 | 168 | 106 | 18 | 15 |
| % Retention Tensile Elongation at Break after Exposure to E85, 70° C. | | | | | |
| 7 | 100 | 98 | 99 | 100 | 91 |
| 11 (Comparative) | 100 | 65 | 41 | 7 | 6 |
| % Retention in PBT Mw after Exposure to E85 at 70° C. | | | | | |
| 7 | 100.0 | 85.8 | 71.9 | 74.8 | 67.8 |
| 11 (Comparative) | 100.0 | 86.0 | 85.1 | 80.9 | 76.8 |

Discussion of Results

Table 7 shows the effect of immersion in E85 fuel on PBT-ABS and PC-PBT blends (Ex. 7 and 11). After 21 and 28 days exposure to E85 fuel (85 vol. % ethanol) at 70° C. the PBT-ABS blend shows high retention of elongation at break whereas the PC-PBT blend (Ex. 11) loses almost all its initial elongation after exposure in the same time period. The PBT-ABS composition (Ex. 7) shows that at least 75% of its initial tensile elongation at break, as measured by ASTM D638, after exposure to Fuel E85 for 15 days at 70° C. In addition, greater than 65% of the initial PBT molecular weight (Mw) was retained even after 28 day exposure to E85 fuel at 70° C.

While the invention has been illustrated and described in typical embodiments, it is not intended to be limited to the details shown, since various modifications and substitutions are possible without departing from the spirit of the present invention. As such, modifications and equivalents of the invention herein disclosed may occur to persons skilled in the art using no more than routine experimentation, and all such modifications and equivalents are believed to be within the spirit and scope of the invention as defined by the following claims.

What is claimed is:

1. A thermoplastic composition comprising, based on the total weight of the composition:

from 51 to 90 wt % of a polyester having
a weight average molecular weight from 20,000 to 80,000 daltons,
a carboxylic acid end group content from 5 to 50 meq/kg, and
a melting point temperature from 200 to 285° C.,
wherein the polyester is selected from the group consisting of poly(ethylene terephthalate)s, poly(1,4-butylene terephthalate)s, poly(1,3-propylene terephthalate)s, poly(cyclohexanedimethanol terephthalate)s, poly(cyclohexanedimethylene terephthalate)-co-poly(ethylene terephthalate)s, and a combination thereof;

from 10 to 49 wt % of an acrylonitrile-butadiene-styrene impact modifier composition, having
an average particle size of 50 to 800 micrometers,
a gel content of at least 50 wt %,
a polybutadiene content of at least 50 wt % of the impact modifier composition, and
a soluble styrene-acrylonitrile copolymer content ranging from 0 to 10 wt % of the impact modifier composition;

from 0 to 20 wt % of a multifunctional epoxy compound;
from 0 to 40 wt % of a filler;
from 0 to 2 wt % of a fibrillated fluoropolymer; and
1 to 5 wt % of a thioether ester having a molecular weight of greater than 500 Daltons;
wherein an article that is blow molded from the thermoplastic composition
has a multi-axial impact total energy ranging from 30 to 100 Joules at −30° C., measured in accordance with ASTM D3763, and a ductility of more than 50% at −40° C.;
has a permeability of more than 0 and less than or equal to 1.5 g/m²-day to ASTM D 471-98 Fuel C, measured after exposure to ASTM D 471-98 Fuel C vapor for 20 weeks at 40° C., using a disc having a diameter of 22 mm and a thickness of 2 mm;
has an MVR of 1 to 20 cc/10 min, measured in accordance with ASTM D1238 at 265° C.;
has a flexural modulus of greater than 1300 MPa, measured in accordance with ASTM D790; and
retains at least 75% of its initial tensile elongation at break, as measured by ASTM D638, after exposure to Fuel E85 for 28 days at 70° C.

2. The thermoplastic composition of claim 1,
wherein the composition comprises at least one stabilizer selected from the group consisting of hindered phenols, phosphites, phosphonites, phosphoric acid, and a combination thereof; and
wherein the thermoplastic composition has a ratio of melt viscosity at a shear rate of 50 s$^{-1}$ to a melt viscosity at a shear rate of 4000 s$^{-1}$ of 6 to 12, measured at 265° C. in accordance with ASTM D3835.

3. The thermoplastic composition of claim 1, having a heat distortion temperature at 66 psi (0.45 MPa) of greater than or equal to 75° C.

4. The thermoplastic composition of claim 1, wherein a bar having a thickness ranging from 2 to 6 mm and cut from a blow molded article comprises the composition and has a multi-axial impact total energy ranging from 30 to 100 Joules at −30° C., measured in accordance with ASTM D3763.

5. The composition of claim 1, comprising from more than zero to 20 wt % of the multifunctional epoxy compound, wherein the multifunctional epoxy compound is selected from the group consisting of cycloaliphatic diepoxy compounds, copolymers comprising units derived from the reaction of an ethylenically unsaturated compound and glycidyl (meth)acrylate, terpolymers comprising units derived from the reaction of two different ethylenically unsaturated compounds and glycidyl (meth)acrylate, styrene-(meth)acrylic copolymers containing a glycidyl groups incorporated as a side chain, and a combination thereof.

6. The composition of claim 1, comprising from 1 to 15 wt % of a dicycloaliphatic diepoxy compound or a terpolymer comprising units derived from the reaction of ethene, a $C_{1-6}$ alkyl (meth)acrylate, and glycidyl (meth)acrylate.

7. The composition of claim 1, wherein the filler is present in an amount of more than 0 to 30 weight percent of the total weight of the composition, and is selected from the group consisting of glass fibers, glass beads, glass flakes, milled glass, silica, wollastonite, talcs, clay, nanoclays, and a combination thereof.

8. The composition of claim 1, wherein the fibrillated fluoropolymer is a polymer encapsulated fluoropolymer comprising poly(tetrafluoroethylene) encapsulated with styrene-acrylonitrile and is present in an amount ranging from 0.1 to 1.0 wt. %.

9. The composition of claim 1, wherein the thioether ester is a $C_{4-20}$ alkyl ester of thiodipropionic acid.

10. The composition of claim 1, wherein the thioether ester is a $C_{4-20}$ alkyl ester of beta-laurylthiopropionic acid.

11. The thermoplastic composition of claim 1, comprising
from 60 to 80 wt % of the polyester;
from 10 to 30 wt % of the acrylonitrile-butadiene-styrene impact modifier composition,
from 0.1 to 20 wt % of the multifunctional epoxy compound, wherein the multifunctional epoxy compound is selected from the group consisting of dicycloaliphatic diepoxy compounds or terpolymers comprising units derived from the reaction of ethene, a $C_{1-6}$ alkyl (meth)acrylate, and glycidyl (meth)acrylate; and
from 0.1 to 2 wt % of the fibrillated fluoropolymer.

12. The thermoplastic composition of claim 11, wherein the polyester is poly(1,4-butylene terephthalate).

13. The thermoplastic composition of claim 12, wherein the composition does not contain a polyester selected from the group consisting of poly(ethylene terephthalate)s, poly(1,3-propylene terephthalate)s, poly(cyclohexanedimethanol terephthalate)s, poly(cyclohexanedimethylene terephthalate)-co-poly(ethylene terephthalate)s, and a combination thereof.

14. The thermoplastic composition of claim 1, comprising
from 60 to 80 wt % poly(1,4-butylene terephthalate);
from 10 to 30 wt % of the acrylonitrile-butadiene-styrene impact modifier composition,
from 0.1 to 20 wt % a terpolymer comprising units derived from the reaction of ethene, a $C_{1-6}$ alkyl (meth)acrylate, and glycidyl (meth)acrylate; and
from 0.1 to 2 wt % poly(tetrafluoroethylene) encapsulated with styrene-acrylonitrile.

15. An injection molded article comprising the composition of claim 1.

16. The injection molded article of claim 15, wherein the article is a fuel tank, and wherein after storage of ASTM E85 fuel for 28 days at 23° C., the composition retains at least 75% of its initial tensile elongation at break, as measured by ASTM D638.20.

17. A blow molded article comprising the composition of claim 1.

18. The blow molded article of claim 17, wherein the article is a fuel tank and wherein after storage of ASTM E85 fuel for 28 days at 70° C., the composition retains at least 75% of its initial tensile elongation at break, as measured by ASTM D638.

19. The blow molded article of claim 17, wherein at least a portion of the article is hollow, and further wherein the article has a liquid capacity from 0.47 liter (1 pint) to 18.9 liters (5 gallons).

20. The blow molded article of claim 17, wherein the article has a minimum wall thickness from 1 to 10 millimeters.

21. A process for blow molding a fuel tank, comprising:
heating a thermoplastic composition in a screw-driven melt processing device to a temperature of 230 to 300° C. to form a molten composition;
pushing the molten composition through an orifice to create an annular tube of the molten thermoplastic composition;
closing off an end of the annular tube to form a closed end annular tube;
encasing the closed ended annular tube in a mold;
blowing a gas into the closed ended annular tube while the thermoplastic composition is above the crystallization temperature of the composition, until the closed ended tube assumes the shape of the mold to form a shaped tube; and
cooling the shaped tube to temperature below the crystallization temperature of the thermoplastic composition to form the article;
wherein the composition comprises
from 51 to 90 wt % of a polyester having
a weight average molecular weight from 20,000 to 80,000 daltons,
a carboxylic acid end group content from 5 to 50 meq/kg, and
a melting point temperature from 200 to 285° C.,
wherein the polyesters is selected from the group consisting of poly(ethylene terephthalate)s, poly(1,4-butylene terephthalate)s, poly(1,3-propylene terephthalate)s, poly(cyclohexanedimethanol terephthalate)s, poly(cyclohexanedimethylene terephthalate)-co-poly(ethylene terephthalate)s, and a combination thereof;
from 10 to 49 wt % of an acrylonitrile-butadiene-styrene impact modifier composition, having
an average particle size from 50 to 800 micrometers,
a gel content of at least 50 wt %, and
a polybutadiene content of at least 50 wt % of the impact modifier composition;
from 0 to 20 wt % of a multifunctional epoxy compound;
from 0 to 40 wt % of a filler;
from 0 to 2 wt % of a fibrillated fluoropolymer; and
1 to 5 wt % of a thioether ester having a molecular weight of greater than 500 Daltons; and
wherein a blow molded sample of the composition has a multi-axial impact total energy from 30 to 100 Joules at −30° C., measured in accordance with ASTM D3763, and a ductility of more than 50% at −40° C.

22. The method of claim 21, further comprising blowing a gas into the closed ended annular tube comprising the composition until the closed ended tube has an outer diameter that is greater than or equal to 1.3 times the outer diameter of the annular tube.

23. A thermoplastic composition comprising, based on the total weight of the composition:
from 51 to 90 wt % of a polyester having
a weight average molecular weight from 20,000 to 80,000 daltons,
a carboxylic acid end group content from 5 to 50 meq/kg, and
a melting point temperature from 200 to 285° C.,
wherein the polyester is poly(1,4-butylene terephthalate)s,
from 10 to 49 wt % of an acrylonitrile-butadiene-styrene impact modifier composition, having
an average particle size of 50 to 800 micrometers,
a gel content of at least 50 wt %,
a polybutadiene content of at least 50 wt % of the impact modifier composition, and
a soluble styrene-acrylonitrile copolymer content ranging from 0 to 10 wt % of the impact modifier composition;
from more than 0 to 20 wt % of a multifunctional epoxy compound;
from 0 to 40 wt % of a filler;
from 0.1 to 1.0 wt. % of a fibrillated fluoropolymer, the fibrillated fluoropolymer being an encapsulated fluoropolymer comprising poly(tetrafluoroethylene) encapsulated with styrene-acrylonitrile;
1 to 5 wt % of a $C_{4-20}$ alkyl ester of beta-laurylthiopropionic acid;
wherein an article that is blow molded from the thermoplastic composition has a multi-axial impact total energy ranging from 30 to 100 Joules at −30° C., measured in accordance with ASTM D3763, and a ductility of more than 50% at −40° C.;

has a permeability of more than 0 and less than or equal to 1.5 g/m²-day to ASTM D 471-98 Fuel C, measured after exposure to ASTM D 471-98 Fuel C vapor for 20 weeks at 40° C., using a disc having a diameter of 22 mm and a thickness of 2 mm;

has an MVR of 1 to 20 cc/10 min, measured in accordance with ASTM D1238 at 265° C.;

has a flexural modulus of greater than 1300 MPa, measured in accordance with ASTM D790; and retains at least 75% of its initial tensile elongation at break, as measured by ASTM D638, after exposure to Fuel E85 for 28 days at 70° C.

24. The composition of claim 23, wherein the composition comprises 1 wt. % to about 1.5 wt. % of the $C_{4-20}$ alkyl ester of beta-laurylthiopropionic acid and does not contain a polyester selected from the group consisting of poly(ethylene terephthalate)s, poly(1,3-propylene terephthalate)s, poly(cyclohexanedimethanol terephthalate)s, poly(cyclohexanedimethylene terephthalate)-co-poly(ethylene terephthalate)s, and combinations thereof.

\* \* \* \* \*